United States Patent [19]

Collins

[11] 4,053,337

[45] Oct. 11, 1977

[54] HEATING COMPOSITION

[75] Inventor: William H. Collins, Timonium, Md.

[73] Assignee: Catalyst Research Corporation, Baltimore, Md.

[21] Appl. No.: 665,191

[22] Filed: Aug. 24, 1967

Related U.S. Application Data

[62] Division of Ser. No. 378,489, June 23, 1964.

[51] Int. Cl.² .............................................. C06B 33/00
[52] U.S. Cl. ........................................... 149/37; 149/2
[58] Field of Search ................ 149/37, 44, 2; 102/102

[56] References Cited

U.S. PATENT DOCUMENTS

| | | | |
|---|---|---|---|
| 3,150,020 | 9/1964 | Kilmer | 149/37 |
| 3,160,097 | 12/1964 | Colburn et al. | 149/37 |
| 3,294,602 | 12/1966 | Francis et al. | 149/15 |

*Primary Examiner*—Stephen J. Lechert, Jr.

[57] ABSTRACT

Combustible compositions comprise a higher oxide of a metal having at least two valence states, such as tungsten and molybdenum, and a reducing metal in an amount to reduce the higher oxide to a lower electrically conductive oxide. The compositions on burning form an electrically conductive ash.

3 Claims, No Drawings

HEATING COMPOSITION

This is a division of Ser. No. 378,489, filed June 23, 1964. This invention relates to combustible compositions that undergo exothermic reaction without the liberation of any substantial amount of gas to form an ash that is electrically conductive. Such compositions are particularly useful as a heat source for thermal type deferred action primary batteries. Thermal batteries include an assembly of two or more primary cells, each of which include one positive plate and one negative plate and an electrolyte that is solid and inactive at ordinary temperatures but which becomes functionally active when heat is supplied in an amount sufficient to melt, or fuse, the electrolyte. The necessary supply of heat to activate such batteries has been provided by associating with the battery a combustible composition that undergoes exothermic reaction without the liberation of any substantial amount of gas, as by positioning a pad containing the combustible composition between each individual cell of the battery. When combustible compositions of this invention are used to space adjacent cells, the activation of the battery by burning the combustible material to provide heat to melt or fuse the electrolyte, the electrically conductive ash formed thereby provides an electrical connection between the adjacent cells.

The combustible compositions of this invention are intimate mixtures of a finely divided metal oxide with a finely divided reducing metal that will exothermically react to form an electrically conductive metal oxide that is dispersed throughout the composition, as by melting or subliming. Combustible compositions that originally have an extremely low conductivity but form, on burning, an ash with extremely high conductivity comprise higher oxides of metals having at least two valence states and that form on partial reduction an electrically conductive lower oxide, for example, tungsten trioxide and molybdenum trioxide. Any metal that reduces the oxide may be used; that is, any metal that forms oxides having a lower free energy of formation than the metal oxide to be reduced. Suitable reducing metals for use with the tungsten trioxide and molybdenum trioxide include iron, cobalt, nickel, chromium, molybdenum, aluminum, boron, magnesium, titanium and zirconium and tantalum.

The proportion of metal in the combustible composition is not more than about the stoichiometric amount required to reduce the higher metal oxide to the desired lower oxidation state. Somewhat more metal may be used for applications where atmospheric oxygen will be available to the reaction, e.g., to account for air entrapped in batteries. Some metals form a number of oxides, and the metal constituent may be used in any amount up to stoichiometric required by reaction with the oxide constituent to form the lowest suitable oxide. For example, tungsten forms a number of oxides lower than tungsten trioxide, e.g., $W_2O_5$, $W_4O_{11}$, $W_2O_3$, and WO, all of which are conductive, thus the stoichiometric amount of metal may be based on a reaction to yield any of these lower oxides. Proportions of metal as low as about 20% of stoichiometric may be used as desired, the proportions being varied to provide the amount of heat and burning rate desired. Inert diluents, such as sand, may also be added to adjust the amount of heat produced; but the total amount of such diluents, including fibers used in forming pads, should not exceed about 40% of active combustible composition to avoid a noticeable affect on the electrical conductivity of the produced ash.

Pads of combustible material suitable for convenient use in batteries may be formed from thoroughly mixed slurries of metal oxide powder, metal powder, inert diluent if desired, and inorganic fibers, such as asbestos fibers, glass fibers, ceramic fibers or the like. It is preferred that the fibers be fine and flexible, since pads produced therefrom are more flexible and more dense. Pads may be formed from such slurries in a number of conventional ways, for example, by forming and drying in a sheet mold. Also, a mat may be formed by laying down the slurry on a screen, to form essentially a fiber paper filled with the combustible composition, using conventional paper-making equipment, such as a cylinder paper machine or Fourdinier machine. At least about 12% fibers are required to form a coherent pad and up to 25% or more fibers can generally be used without any noticeable affect on the conductivity of the ash formed by burning the pad. Drying temperatures must, of course, be kept below the ignition temperature of the combustible composition.

Alternatively, finely divided and well mixed constituents of the combustible composition, with or without fibers, may be compressed, either in the wet or dry state, to form a coherent compact pellet or wafer. The temperature during compression must, of course, be kept below the ignition temperature of the combustible composition and in some instances this may require that the mixture be cooled. Heating pads of the desired shape for use in batteries may be cut or punched from larger pads formed as described above, and the pelletized wafers are formed in the desired shape.

The following example is illustrative of heating compositions of this invention.

A mat was formed in a sheet mold from a thoroughly mixed aqueous slurry containing 19.0 grams of powdered zirconium, 42.5 grams of tungsten trioxide, 6.5 grams of glass fibers and 6.5 grams of ceramic fibers. After being dried, the mat was positioned between two metal plates in one arm of a Wheatstone bridge. The mat was ignited and the resistance, determined in the usual manner, was found to be less than 0.1 ohm per square inch. Such pads have a resistance on the order of 100,000 ohms per square inch before ignition. Similarly, low conductivity ashes are obtained using other reducing metals or when using molybdenum trioxide with zirconium or other reducing metals.

In accordance with the provisions of the patent statutes, I have explained the principle of my invention and have described what I now consider its best embodiments. However, I desire to have it understood that, within the scope of the appended claims, the invention may be practiced otherwise than as specifically described.

I claim:

1. A combustible composition consisting essentially of an intimate mixture of finely divided tungsten trioxide and a finely divided metal selected from the group consisting of iron, cobalt, nickel, chromium, molybdenum, aluminum, boron, magnesium, titanium, zirconium and tantalum.

2. A composition according to claim 1 in which the metal is zirconium.

3. A composition according to claim 1 containing between about 12 and 25 per cent inorganic fibers.

* * * * *